US010505392B2

(12) United States Patent
McSweyn et al.

(10) Patent No.: US 10,505,392 B2
(45) Date of Patent: Dec. 10, 2019

(54) MAGNETIC DEVICE MOUNT

(71) Applicant: SCOSCHE INDUSTRIES, INC., Oxnard, CA (US)

(72) Inventors: Christopher Michael McSweyn, Oxnard, CA (US); Vince Alves, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 270 days.

(21) Appl. No.: 15/366,207

(22) Filed: Dec. 1, 2016

(65) Prior Publication Data

US 2018/0159369 A1 Jun. 7, 2018

(51) Int. Cl.
*H02J 50/10* (2016.01)
*H01F 7/02* (2006.01)
*H01F 38/14* (2006.01)
*H02J 7/02* (2016.01)

(52) U.S. Cl.
CPC ............ *H02J 50/10* (2016.02); *H01F 7/0252* (2013.01); *H01F 38/14* (2013.01); *H02J 7/025* (2013.01)

(58) Field of Classification Search
CPC ......... H02J 50/10; H02J 7/025; H01F 7/0252; H01F 38/14
See application file for complete search history.

(56) References Cited

U.S. PATENT DOCUMENTS 3,329,277 A 7/1967 Gaudino
3,642,122 A 2/1972 Ende
4,287,676 A * 9/1981 Weinhaus ............... G09F 7/18
248/206.5

(Continued)

FOREIGN PATENT DOCUMENTS

CN 201113495 9/2008
CN 202042680 11/2011
(Continued)

OTHER PUBLICATIONS

Supermagnete ,"Data sheet article S-20-03-N52N," Dec. 3, 2015, pp. 1-3 (Year: 2015).*

(Continued)

*Primary Examiner* — Pinping Sun
(74) *Attorney, Agent, or Firm* — Stetina Brunda Garred & Brucker

(57) ABSTRACT

A mounting assembly for transferring electrical power to an inductively powered device is contemplated, with a plurality of magnets positioned inside the mounting assembly includes for magnetically attracting and retaining the inductively powered device against a face plate, and for axially aligning the inductive power receiver of the inductive powered device with the inductive coil assembly inside the mounting assembly. A mounting support member is attached to the back plate of the mounting housing with adjustable joint for adjusted the orientation of the mounting housing relative to the mounting support member. The magnets retain the inductively powered device against the face plate and in the correct orientation with the inductive coil assembly even against forces which would otherwise disturb the inductive coupling, permitting use of the mounting assembly to transfer power in non-horizontal orientations and in moving vehicles.

20 Claims, 3 Drawing Sheets

(56) References Cited

U.S. PATENT DOCUMENTS

| | | | |
|---|---|---|---|
| D306,396 S | 3/1990 | Brushaber | |
| D317,697 S | 6/1991 | Lage | |
| D327,840 S | 7/1992 | Askew | |
| 5,213,240 A | 5/1993 | Dietz et al. | |
| D362,230 S | 9/1995 | Yokozawa | |
| D362,657 S | 9/1995 | Tomikawa et al. | |
| 5,781,112 A * | 7/1998 | Shymko | A22B 5/0064 340/10.3 |
| D398,796 S | 9/1998 | Fauchald | |
| 5,992,807 A | 11/1999 | Tarulli | |
| 6,075,499 A | 6/2000 | Edwards et al. | |
| 6,076,790 A | 6/2000 | Richter | |
| 6,135,408 A | 10/2000 | Richter | |
| 6,149,116 A | 11/2000 | Won | |
| 6,305,656 B1 | 10/2001 | Wemyss | |
| 6,382,482 B1 | 5/2002 | Chao | |
| 6,502,727 B1 | 1/2003 | Decoteau | |
| D479,196 S | 9/2003 | Shih | |
| D489,578 S | 5/2004 | Lai | |
| 6,888,940 B1 | 5/2005 | Deppen | |
| 7,021,593 B1 | 4/2006 | Fan | |
| D521,850 S | 5/2006 | Richter et al. | |
| D530,333 S | 10/2006 | Richter | |
| D543,439 S | 5/2007 | Brassard | |
| D551,058 S | 9/2007 | Carnevali | |
| D552,454 S | 10/2007 | Fynn | |
| D553,959 S | 10/2007 | Brassard | |
| D554,042 S | 10/2007 | Richter | |
| D554,491 S | 11/2007 | Stenberg et al. | |
| 7,296,771 B2 | 11/2007 | Kalis et al. | |
| D560,592 S | 1/2008 | Brassard | |
| D563,309 S | 3/2008 | Richter | |
| D565,937 S | 4/2008 | Tsai | |
| 7,374,142 B2 | 5/2008 | Carnevali | |
| D570,836 S | 6/2008 | Chen | |
| D576,865 S | 9/2008 | Chiang et al. | |
| 7,431,251 B2 | 10/2008 | Carnevali | |
| D588,903 S | 3/2009 | Carnevali | |
| D590,835 S | 4/2009 | Richter | |
| D592,205 S | 5/2009 | O'Brien | |
| D600,991 S | 9/2009 | Lai | |
| D603,322 S | 11/2009 | Nicieja | |
| D609,644 S | 2/2010 | Lin | |
| D638,008 S | 5/2011 | Richter | |
| 8,016,255 B2 | 9/2011 | Lin | |
| D654,874 S | 2/2012 | Au | |
| D656,465 S | 3/2012 | Au | |
| D656,899 S | 4/2012 | Webb et al. | |
| D670,157 S | 11/2012 | Mo | |
| D671,074 S | 11/2012 | Hori et al. | |
| 8,354,909 B2 * | 1/2013 | Fullerton | G09F 7/04 335/285 |
| D677,709 S | 3/2013 | Skeoch et al. | |
| D681,867 S | 5/2013 | Wegger et al. | |
| D686,595 S | 7/2013 | Andre et al. | |
| 8,496,222 B2 | 7/2013 | Li | |
| D687,441 S | 8/2013 | Janzen | |
| D694,249 S | 11/2013 | Akana et al. | |
| 8,602,376 B2 * | 12/2013 | Vogel | F16M 11/14 248/371 |
| D700,175 S | 2/2014 | Ohm | |
| D705,211 S | 5/2014 | Huang | |
| 8,749,194 B1 * | 6/2014 | Kelsch | H02J 5/005 320/108 |
| D709,066 S | 7/2014 | Byun | |
| D709,072 S | 7/2014 | Askew-Harris et al. | |
| D713,398 S | 9/2014 | Alesi et al. | |
| D715,132 S | 10/2014 | McSweyn et al. | |
| D718,612 S | 12/2014 | McSweyn et al. | |
| D719,959 S | 12/2014 | Vogel | |
| 9,163,775 B2 * | 10/2015 | Rohrbach | B60R 11/0252 |
| 2005/0092875 A1 | 5/2005 | Carnevali | |
| 2006/0290654 A1 | 12/2006 | Wang | |
| 2007/0018064 A1 | 1/2007 | Wang | |
| 2008/0019082 A1 * | 1/2008 | Krieger | B60R 11/0241 361/601 |
| 2008/0023606 A1 | 1/2008 | Kalis et al. | |
| 2008/0212319 A1 * | 9/2008 | Klipstein | F21L 4/08 362/231 |
| 2009/0212637 A1 * | 8/2009 | Baarman | H01F 7/0247 307/104 |
| 2010/0005633 A1 * | 1/2010 | Nolet | H01F 7/0221 24/303 |
| 2011/0150601 A1 * | 6/2011 | Wiggins | F16B 13/0808 411/344 |
| 2011/0192857 A1 | 8/2011 | Rothbaum et al. | |
| 2011/0260681 A1 * | 10/2011 | Guccione | H02J 7/0054 320/108 |
| 2012/0092104 A1 * | 4/2012 | Kocijan | B25B 11/002 335/295 |
| 2012/0229300 A1 | 9/2012 | Fu | |
| 2012/0252543 A1 * | 10/2012 | Cho | F16M 11/041 455/575.8 |
| 2012/0292463 A1 | 11/2012 | Burns | |
| 2012/0295451 A1 | 11/2012 | Kim et al. | |
| 2013/0043827 A1 | 2/2013 | Weinstein et al. | |
| 2013/0187020 A1 | 7/2013 | Trotsky | |
| 2014/0191096 A1 * | 7/2014 | Wiercinski | F16M 13/022 248/206.5 |
| 2014/0266939 A1 * | 9/2014 | Baringer | H01Q 21/28 343/729 |
| 2014/0306656 A1 * | 10/2014 | Tabata | H01F 38/14 320/108 |
| 2014/0346295 A1 | 11/2014 | Song | |
| 2014/0347795 A1 * | 11/2014 | Baca | H01F 7/0252 361/679.01 |
| 2014/0357094 A1 | 12/2014 | Kim | |
| 2015/0002088 A1 * | 1/2015 | D'Agostino | H02J 7/0044 320/108 |
| 2015/0008875 A1 * | 1/2015 | Huang | H02J 7/0044 320/108 |
| 2015/0207351 A1 | 7/2015 | Hamburgen et al. | |
| 2015/0288205 A1 | 10/2015 | Weinstein | |
| 2016/0036478 A1 * | 2/2016 | Wong | H02J 7/0044 455/573 |
| 2016/0259374 A1 * | 9/2016 | Breiwa | H02J 50/10 |
| 2017/0070076 A1 * | 3/2017 | Karanikos | H02J 7/025 |

FOREIGN PATENT DOCUMENTS

| | | |
|---|---|---|
| CN | 203416030 | 1/2014 |
| CN | 203193688 | 11/2015 |
| JP | 2000231910 | 11/2015 |

OTHER PUBLICATIONS

The Original iMagnet Cradle-Less Universal Car Phone Windsheild Dashboard Mount Holder for Iphone 6, 6 Plus, 6S, 6S Plus, 5S 5, Galaxy S6 S5, Note 5 4 3, With Offical iMagnet Logo, iMagnet, Amazon.com, Aug. 19, 2012.

Mounts posted by Scoshe found on Sep. 27, 2016 at http://www.scosche.com/consumer-tech/mounts.

Magnetic Nanoport links phones to accessories, cars, each other; Jan. 7, 2014 http://www.cnetcom/news/magnetic-nanoport-links-phones-to-accessories-cars-each-other/.

Clever smartphone case offers an ingenious way to charge your phone on the go; Jun. 20, 2014 http://bgr.com/2014/06/20/best-smartphone-accessories-zolo/.

Logitech Case+ Review: Brilliant iPhone Case Concept, Flawed Execution; May 13, 2014 http://time.com/98112/logitech-case-plus-review/.

* cited by examiner

MAGNETIC DEVICE MOUNT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to the field of mobile device accessories. More particularly, the present disclosure relates to device mounts for inductive power transfer.

2. Related Art

Inductive power transfer, also referred to as wireless power transfer, is a technique used in the conveyance of power to electrically powered devices without interconnecting wires. Inductive power transfer operates by a passing an alternating current (AC) through a transmitting coil in order to create a localized oscillating magnetic field. When a receiving coil is placed proximally and, for the most optimal transfer, in an orientation in axial alignment with transmitting coil, the oscillating magnetic field induces an AC current in the receiving coil.

Inductive power transfer has been used for transferring power for the purpose of charging the rechargeable batteries of commercial products, especially in situations where the presence of exposed metallic connectors may result in a risk of electrical shock to consumers, such as with bathroom appliances like electrical toothbrushes or electric shavers. Other applications for inductive charging include, for example, the charging or powering of electronic medical devices such as cochlear implants, which may eliminate the need for the placement of physical wires through the skin.

In more recent years, with the growing ubiquity of portable electronic devices such as smartphone and tablets, there is expanding consumer demand for the use of inductive power transfer as a method of charging these portable electronic devices. Inductive chargers, typically seen in the form of pads on which the device to be charged may be placed, provides a great convenience benefit in that the user need only place the device to be charged atop the inductive charger. Furthermore, these inductive chargers, because they rely only on the general principles of electromagnetics, do not require the use of a proprietary power cord that may be specific to the standards of a single manufacturer or geographic region, and instead may be used to charge any device that has a corresponding receiver coil. Thus, a user may use the same inductive charger to transfer power to multiple devices seamlessly, merely by removing one device from placement atop the inductive charger.

However, inductive chargers suffer from several deficiencies. General-purpose inductive chargers, typically pads, are generally only suitable for static use, as they require placement atop a flat surface. As such, they are not suitable for situations such as automotive charging, where the motion of the automobile would negate the advantages of the charger's general purpose capability. Likewise, inductive chargers that have systems for securing the device to be inductively charged, so as to permit use in situations such as in a moving vehicle, generally have their purposes defeated as well, because the convenience advantage of the inductive charger over a direct electrical connection is negated by the need to spend significant time physically securing the device to be charged to the inductive charger, and because the attachment schemes may themselves be propriety to the device to be charged, thus defeating the advantage of interchangeable use of different devices.

Therefore, novel device mounts for inductively charging portable electronic devices are desirable.

BRIEF SUMMARY

To solve these and other problems, a mounting assembly for an inductively powered device having an inductive power receiver and at least a magnetically receptive portion, the mounting assembly comprising a mounting housing comprising an face plate, a back plate, and a mounting plate between the face plate and the back plate, a mounting support member attached to the back plate of the mounting housing, the mounting support member having an adjustable joint for adjusting the orientation of the mounting housing, a plurality of magnets attached to the mounting plate for magnetically attracting the a magnetically receptive portion of the inductively powered device and retaining the inductively powered device against the face plate at substantially all orientations of the mounting housing, and an inductive coil assembly attached to the mounting plate and electrically connectable to a power supply, the inductive coil assembly being operative to inductively couple with the inductive power receiver of the inductively powered device and transmit power thereto when the inductively powered device is retained against the face plate by the plurality of magnets.

The face plate of the mounting assembly may have an elastomeric front surface that may comprise silicone rubber. The plurality of magnets attached to the mounting plate may comprise four neodymium magnets. The individual ones of plurality of magnets may be disc magnets. The individual ones of the plurality of disc magnets may have a diameter of 10 mm and a height of 3 mm.

The individual ones of the plurality of magnets may have a pull force of at least 1 kg, and may have a pull force of at least 1.5 kg. The plurality of magnets may have a collective pull force of at least 4 kg, and may have a pull force of at least 6 kg.

The plurality of magnets and the inductive coil maybe otherwise contained within the mounting housing in lieu of attachment to a mounting plate between the face plate and the back plate of the mounting housing, and the mounting plate may be omitted.

BRIEF DESCRIPTION OF THE DRAWINGS

These and other features and advantages of the various embodiments disclosed herein are better understood with respect to the following descriptions and drawings, in which.

Common reference numerals are used throughout the drawings and the detailed description to indicate the same elements.

DETAILED DESCRIPTION

According to various aspects of the present disclosure, a mounting assembly for transferring electrical power to an inductively powered device is contemplated in which a housing of the mounting assembly includes a plurality of magnets for magnetically attracting and retaining the inductively powered device against the face plate of the housing, and maintaining an axial alignment of the inductive power receiver of the inductive powered device relative to the inductive coil assembly within the mounting assembly. A mounting support member is attached to the back plate of the mounting housing and has an adjustable joint for adjusted the orientation of the mounting housing relative to the point of external attachment or contact of the mounting support member. The attraction between the magnets and the magnetically receptive portion retains the inductively powered device against the face plate and in the correct orientation with the inductive coil assembly against the forces which would otherwise disturb the inductive coupling, such as the force of gravity when the face plate of the mounting housing is not horizontally oriented, or the vibrational and inertial forces that are present when inside a moving vehicle.

Figure 1:
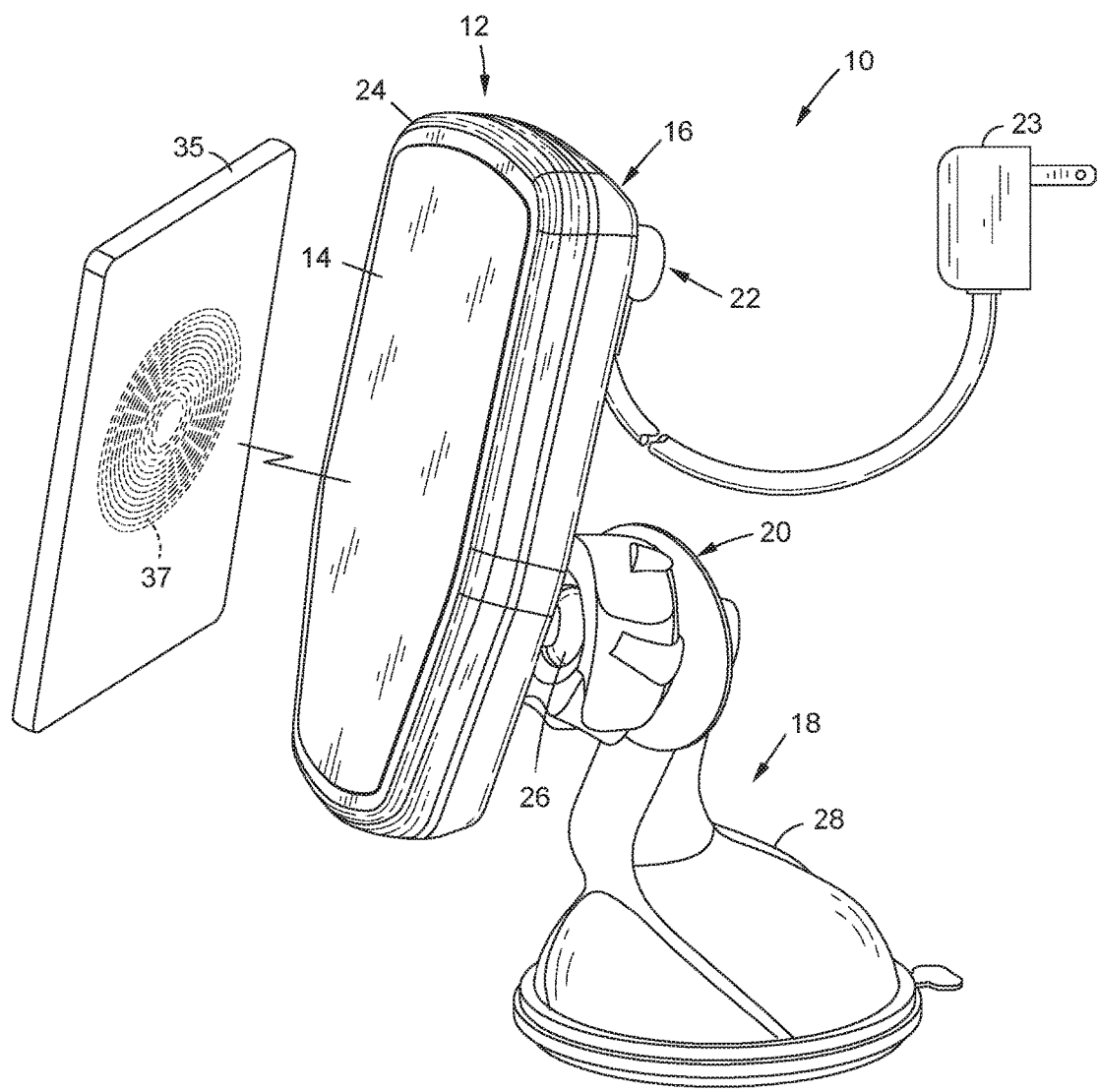
FIG. 1 is perspective view of a mounting assembly according to an exemplary embodiment of the present disclosure.
Figure 2:
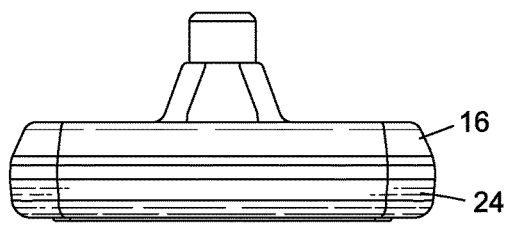
FIG. 2 is a top view of a mounting assembly according to the exemplary embodiment.
Figure 3:
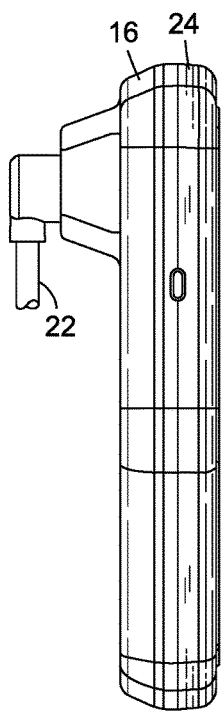
FIG. 3 is a left side view of mounting assembly according to the exemplary embodiment.
Figure 4:
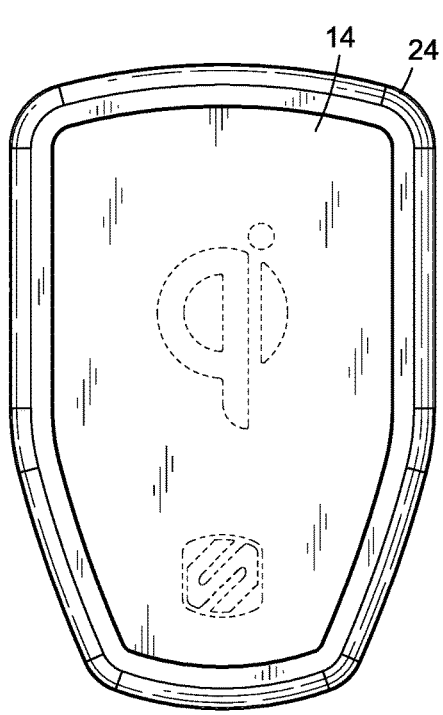
FIG. 4 is a front view of mounting assembly according to the exemplary embodiment.
Figure 5:
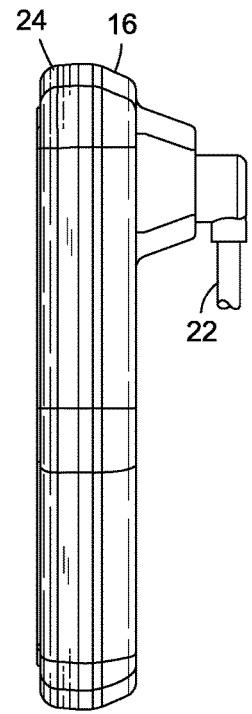
FIG. 5 is a right side view of mounting assembly according to the exemplary embodiment.
Figure 6:
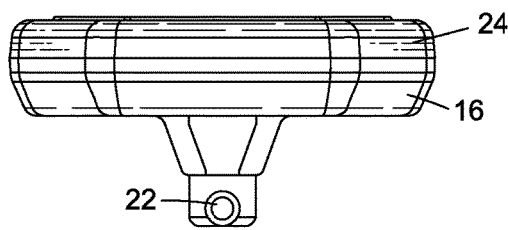
FIG. 6 is a bottom view of mounting assembly according to the exemplary embodiment.

Turning now to FIG. 1, a mounting assembly 10 is shown having a mounting housing 12 with a face plate 14 and a back plate 16. A mounting support member 18 having an adjustable joint 20 for adjusting the orientation of the mounting housing 12 is attached to the back plate 16. Protruding out of the rear of the back plate 16 is a power cable 22 that is electrically connectable to a power supply.

In the exemplary embodiment, the external surface of the face plate 14 may be formed primarily of an elastomeric compound. It may be seen that via the use of an elastomeric compound, the force of the inductively powered device contacting the external surface of the face plate 14 may be more efficiently absorbed so as to reduce the possibility of any damage to the inductively powered device when it becomes adhered to the face plate 14 via magnetic attraction. The face plate 14 may be entirely formed of the elastomeric compound, or the elastomeric compound may be a coating on the external surface of the face plate 14. In the exemplary embodiment, the elastomeric compound is silicone rubber. However, it may be seen that in other embodiments which utilize an elastomeric compound in forming or coating part or all of the face plate, other elastomeric compounds may be used, including but not limited to synthetic compounds such as isoprene rubber, butadiene rubber, neoprene, or even compounds such as natural rubber. However, it may also be seen that the use of an elastomeric compound on the external surface of the face plate 14 is not necessary, and the face plate 14 may be constructed of any suitable material which is capable of forming the face plate 14, with the proviso that the use of ferromagnetic materials such as alloys of iron or nickel, or any other material that may be prone to interact with the propagation of an electromagnetic field therethrough may possibly be disfavored, as the use of such materials may interfere with the magnetic attraction and inductive coupling of the inductively powered device with the mounting assembly.

In the exemplary embodiment, the back plate 16 is formed primarily of a polycarbonate material. However, it may be seen that in other embodiments, the back plate 16 may be constructed of any suitable material which is capable of forming the face plate 14, with the proviso that the use of ferromagnetic materials such as alloys of iron or nickel, or any other material that may be prone to interact with an electromagnetic field may possibly be disfavored, as the use of such materials may interfere with the magnetic attraction and inductive coupling of the inductively powered device with the mounting assembly.

In the exemplary embodiment, the mounting support member 18 comprises a proximal portion 26 attached to the back plate 16, a distal portion 28 which serves as a point of external contact or attachment for the mounting assembly 10, and an adjustable joint 20 connecting the proximal portion 26 to the distal portion 28. However, it may be seen that the mounting support member may comprise and be comprised of any structure or structures which may bear the mounting housing 12 and vary the orientation of the mounting housing 12. For example, the mounting support member 18 may omit a substantial distal portion, and instead have the adjustable joint be at the back plate 16. Alternatively, the mounting support member may comprise a plurality of adjustable joints 20 and multiple portions between the joints, to confer additional adjustability of the mounting support member.

The adjustable joint 20 may be, in the exemplary embodiment, a single ball joint in order to permit rotational adjustment of the orientation of the mounting housing 12. However, it may be seen that the one or more adjustable joints 20 may be, in other embodiments, more or less articulable and with more or less degrees of freedom in individual or in the aggregate than a single ball joint, and may include, for example but without limitation, knuckle joints, revolute joints, screw joints, or other joints known in the art, or combinations thereof.

The distal support member 28 may, in the exemplary embodiment, terminate in a suction cup, which may be seen as achieving the benefit of enabling reversible adherence of the mounting assembly 10 to a smooth surface such as a tabletop or a vehicle windshield. However, in other embodiments, it may be seen that the distal support member may terminate in or with other attachment or otherwise support features which may enable the support of the mounting assembly in free space where its orientation may be adjusted, such as ring clamps, adhesives, hook and loop fasteners, a load-bearing surface, screws, nails, or even seamless integration with a larger object, such as being formed as a portion of a vehicle dashboard. The specifics of how the mounting assembly 10 is supported at the distal end of the mounting support member 28 is not critical to the functionality of the mounting assembly 10, so long as the mounting support member is supported in some way so as to enable the adjusting of the adjustable joint so as to adjust the orientation of the mounting housing 12 in free space.

The mounting assembly 10 may, in the exemplary embodiment, include a power cable 22 extending through the back plate 16 for transmitting power from a power supply 23 to the interior of the mounting housing where the inductive coil assembly resides. However, it may be seen that in other embodiments, the power cable 22 may extend through or past other portions of the mounting housing 12.

For example, but without limitation, the power cable 22 may be integrated with or within the mounting support member 18, or even may be omitted entirely, such as in a situation where the mounting assembly 10 may be configured with an internal power source such as one or more batteries. The presence or absence of a power cable 22 is not critical to the functionality of the mounting assembly 10, so long as the inductive coil assembly is electrically connectable to a power supply in some fashion.

The face plate 14 of the mounting housing 12 may be, in the exemplary embodiment, retained against the mounting housing 12 by a retaining bracket 24 and an adhesive. However, in other embodiments, it may be seen that the presence of a dedicated retaining bracket 24 may not be necessary for retaining the face plate 14, and that the face plate 14 may be otherwise retained by, or integrated into the remainder of the mounting housing 12.

Turning now to FIGS. 2-6, various views of the mounting housing 12 of the exemplary embodiment of the mounting assembly 10 are shown. It is further emphasized, however, that the depicted mounting housing 12 of the exemplary embodiment is merely exemplary, and does not limit the scope of the disclosure.

Figure 7:
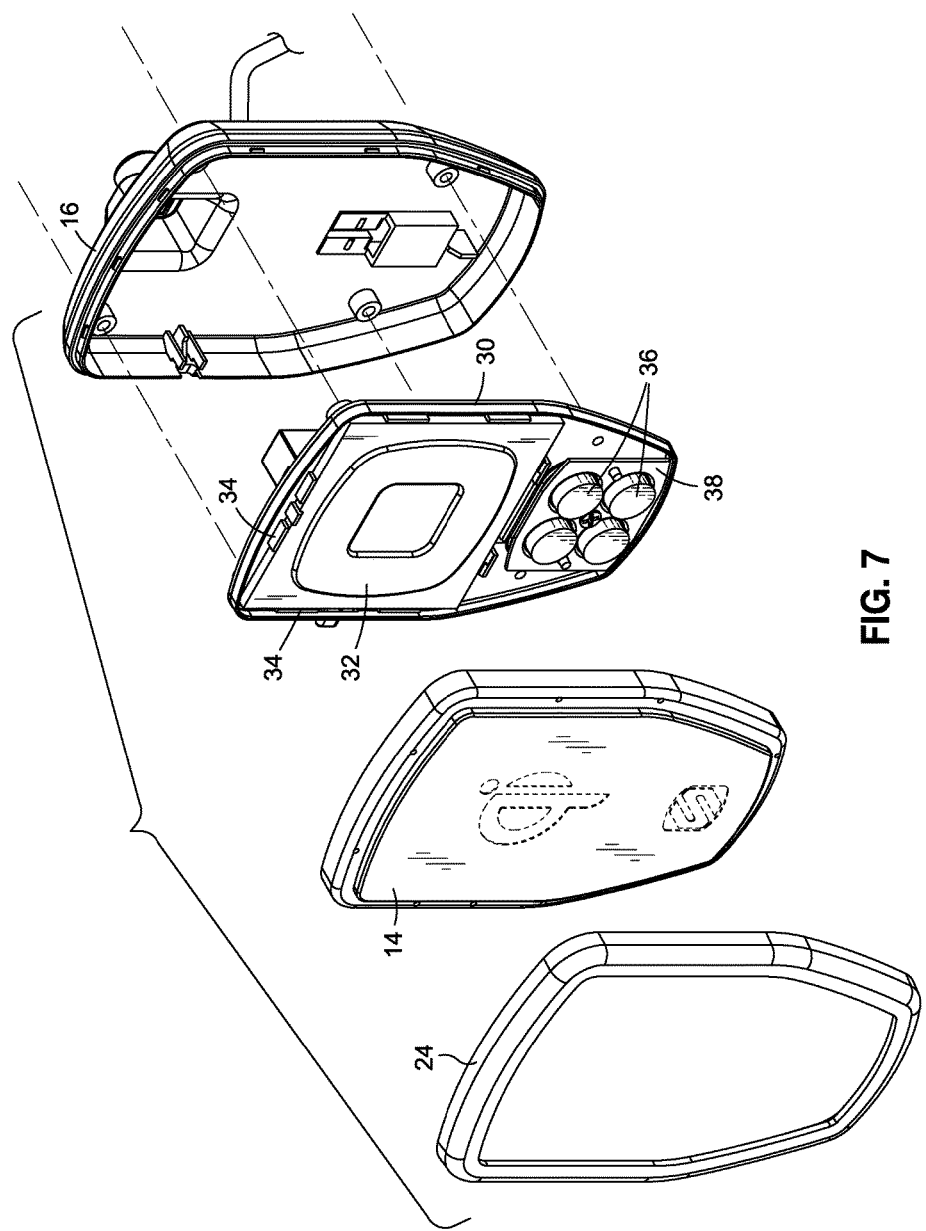
FIG. 7 is a cutaway view of a mounting plate according to the exemplary embodiment.

Turning now to FIG. 7, a view a mounting plate 30 of the exemplary embodiment located within the mounting housing and disposed between the face plate 14 and the back plate 16 is shown. In the exemplary embodiment, an inductive coil assembly 32 and a plurality of magnets 36 are attached to the mounting plate 30. In the exemplary embodiment, the inductive coil assembly 32 is attached to the mounting plate 30 via a plurality of mounting brackets 34. However, it may be seen that in other embodiments, the inductive coil assembly 32 may be attached to the mounting plate 30 in other ways, such as adhesive, screws, tape, or otherwise. In the exemplary embodiment, the mounting plate 30 is formed primarily of a polycarbonate material. However, it may be seen that in other embodiments, the mounting plate 30 may be constructed of any suitable material which is capable of forming the mounting plate 30, with the proviso that the use of ferromagnetic materials such as alloys of iron or nickel, or any other material that may be prone to interact with an electromagnetic field may possibly be disfavored, as the use of such materials may interfere with the magnetic attraction and inductive coupling of the inductively powered device with the mounting assembly 10.

Further, it may be seen that the presence of the mounting plate 30 is not strictly necessary, in that while it may serve to support and directly locate the inductive coil assembly 32 and the plurality of magnets 34 behind the face plate 14 whereupon they may both interact with a inductively powered device having at least a magnetically receptive portion, the inductive coil assembly 32 and the plurality of magnets 34 may be located within the mounting housing 12 in any fashion so long as inductive coil 32 may inductively couple with the inductive power receiver 37 of a inductively powered device 35 placed in contact with the face plate while the inductively powered device is retained against the face plate by the plurality of magnets 36. For example, in an alternative embodiment, one or both of the inductive coil assembly 32 and the plurality of magnets may be located on the interior surface of the face plate 14 or the back plate 16.

The inductive coil assembly 32 may be, for example and without limitation, formed of any coil of any conductive material which may induce inductive coupling with the inductive power receiver of an inductively powered device. In the exemplary embodiment, the inductive coil assembly 32 is formed as a coil embedded with a printed circuit board, and is controlled by the printed circuit board. However, it may be seen that the exact details of the inductive coil assembly 32 may vary and still fall within the scope of the present disclosure, so long as it may induce inductive coupling with the inductive power receiver of an inductively powered device that is placed and retained against the face plate 14 of the mounting housing 12.

In the exemplary embodiment, the plurality of magnets 36 is retained against the mounting plate 30 by a magnet plate 38 disposed over the plurality of magnets 36 and held against the mounting plate 30 with a screw. However, it may be seen that in other embodiments, the plurality of magnets 36 may be retained against the mounting plate 30 or retained at other locations within the mounting housing 12, such as against the interior surfaces of the face plate 14 or the back plate 16, in other ways. For example, but without limitation, the individual ones of the plurality of magnets 36 may be glued by or encased within an adhesive, or structurally integrated within other components of the mounting housing 12.

It may be seen that in the exemplary embodiment, the individual ones of the plurality of magnets 36 are positioned adjacent to one another. However, it may be seen that in other embodiments, the plurality of magnets 36 may be positioned dispersed and/or non-adjacently, such as around the periphery of the mounting housing 12. The exact positioning of the plurality of magnets 36 is not critical to the disclosure, except that the positioning be such that the magnets are configured to magnetically attract one or more magnetically receptive portions of an inductively powered device and retain the inductively powered device against the face plate 14 at substantially all orientations of the mounting housing to which it may be adjusted by the adjustable joint 20. For example, the magnetically receptive portion of the inductively powered device may be all or substantial portions of the inductively powered device itself, or may be a separate component attached to the inductively powered device, such as a third party peripheral like a protective case. In such cases, it may be beneficial for the third party peripheral to be sold to be compatible with the specific orientation of the plurality of magnets 36 and the inductive coil assembly 32, so that the inductively powered device will be maximally adhered to the face plate 14 via attraction to the plurality of magnets 36 when the inductive power received is axially aligned with the inductive coil assembly 32. Further, it may be seen that the inductive coil assembly may likewise be either an integrated component with the inductively powered device, or may be a third party peripheral such as a case that is physically attachable and electrically connectible to the inductively powered device.

It may further be seen that the use of a plurality of magnets 36 is important, because by the presence a plurality of magnets 36, as opposed to a single magnet, will tend to prevent rotation of the inductively powered device along the plane of the face plate 14, and thus will potentially result in the inductive coil assembly 32 not or no longer being aligned with the inductive power receiver, thus preventing or reducing the inductive coupling between the two components.

In the exemplary embodiment, the plurality of magnets 36 are four neodymium magnets, which are permanent rare-earth magnets made from an alloy of neodymium, iron, and boron having a $Nd_2Fe_{14}B$ tetragonal crystalline structure. However, in other embodiments it may be seen that the plurality of magnets 36 may other types of magnets, including for example, permanent magnets such as rare earth magnets, sintered composite magnets, or ferrimagnets, or temporary magnets such as electromagnets, which may, for example, be powered by same power supply as the inductive coil assembly 32, or combinations thereof. The exact identity of the individual ones of the plurality of magnets 36 is not crucial, so long as the plurality of magnets 36 may serve to retain the inductively powered device against the face plate 14 at substantially all orientations of the magnet housing 12.

In the exemplary embodiment, the individual ones of the plurality of magnets 36 are disc magnets. However, it may be seen that other shapes of magnets may be utilized without departing from the scope and spirit of the present disclosure, including, for example and without limitation, bars, squares, or spheres, or combinations thereof. In the exemplary embodiment, the disc magnets each of have a diameter of 10 mm and a height of 3 mm. However, it may be seen that in embodiments which utilize disc magnets, those disc magnets may vary in size.

The strength of the individual ones of the plurality of magnets 36 is measured as the pull force. The pull force is the normal force required to detach a magnet from a work load surface formed of 1018 cold rolled steel ASTM A794 that is large enough for the magnet-working surface to make 100% contact and thick enough to absorb all lines of magnetic flux emanating from the magnet. In the exemplary embodiment, the individual ones of the plurality of magnets 36 are N35 neodymium magnets, which have a pull force of 1.6 kg, and thus the four N35 neodymium magnets together have a collective pull force of 6.4 kg. However, it may be seen that in other embodiments, the individual ones of the plurality of magnets 36 may have more or less pull force than those used in the exemplary embodiment, and may collectively have more or less pull force than the four magnets used in the exemplary embodiment. For example, the individual ones of the plurality of magnets 36 may have a pull force of at least 1 kg, or at least 1.5 kg. Likewise, the plurality of magnets 36 may have a collective pull force of at least 4 kg, or at least 6 kg.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A mounting assembly for an inductively powered device having an inductive power receiver and at least a magnetically receptive portion, the mounting assembly comprising:
    a mounting housing comprising a face plate, a back plate, and a mounting plate between the face plate and the back plate;
    a mounting support member attached to the back plate of the mounting housing, the mounting support member having an adjustable joint for adjusting the orientation of the mounting housing;
    a plurality of magnets attached to a first section of the mounting plate for magnetically attracting at least the magnetically receptive portion of the inductively powered device along a magnet facial axis normal to a mounting plate plane and retaining the inductively powered device against the face plate at substantially all orientations relative to the mounting housing; and
    an inductive coil assembly attached to a second section of the mounting plate and electrically connectable to a power supply, the inductive coil assembly being operative to inductively couple with the inductive power receiver of the inductively powered device along a coil facial axis normal to the mounting plate plane and transmit power thereto when the inductively powered device is retained against the face plate by the plurality of magnets;
    wherein the first section of the mounting plate and the second section of the mounting plate defines an offset planar relationship relative to each other along the mounting plate plane, the magnet facial axis of the plurality of magnets being parallel to and offset from the coil facial axis of the inductive coil assembly.

2. The mounting assembly of claim 1, wherein the face plate has an elastomeric front surface.

3. The mounting assembly of claim 2, wherein the elastomeric front surface of the face plate comprises silicone rubber.

4. The mounting assembly of claim 1, wherein the plurality of magnets attached to the mounting plate comprise four neodymium magnets.

5. The mounting assembly of claim 1, wherein individuals ones of the plurality of magnets attached to the mounting plate are disc magnets.

6. The mounting assembly of claim 5, wherein the individual ones of the plurality of neodymium magnets have a diameter of 10 mm and a height of 3 mm.

7. The mounting assembly of claim 1, wherein individual ones of the plurality of magnets have a pull force of at least 1 kg.

8. The mounting assembly of claim 1, wherein individual ones of the plurality of magnets have a pull force of at least 1.5 kg.

9. The mounting assembly of claim 1, wherein the plurality of magnets attached to the mounting plate have a collective pull force of at least 4 kg.

10. The mounting assembly of claim 1, wherein the plurality of magnets attached to the mounting plate have a collective pull force of at least 6 kg.

11. A mounting assembly for an inductively powered device having an inductive power receiver and at least a magnetically receptive portion, the mounting assembly comprising:
    a mounting housing comprising an face plate and a back plate;
    a mounting support member attached to the back plate of the mounting housing, the mounting support member having an adjustable joint for adjusting the orientation of the mounting housing;
    a plurality of magnets contained within a first section of the mounting housing for magnetically attracting at least the magnetically receptive portion of the inductively powered device along a magnet facial axis normal to a mounting housing face plate plane and retaining the inductively powered device against the face plate at substantially all orientations relative to the mounting housing;
    an inductive coil assembly within a second section of the mounting housing and electrically connectable to a power supply, the inductive coil assembly being operative to inductively couple with the inductive power receiver of the inductively powered device along a coil facial axis normal to the mounting housing face plate plane and transmit power thereto when the inductively powered device is retained against the face plate by the plurality of magnets;

wherein the first section of the mounting housing and the second section of the mounting housing defines an offset planar relationship relative to each other along the mounting housing face plate plane, the magnet facial axis of the plurality of magnets being parallel to and offset from the coil facial axis of the inductive coil assembly.

12. The mounting assembly of claim 11, wherein the face plate has an elastomeric front surface.

13. The mounting assembly of claim 12, wherein the elastomeric front surface of the face plate comprises silicone rubber.

14. The mounting assembly of claim 11, wherein the plurality of magnets attached to a mounting plate comprise four neodymium magnets.

15. The mounting assembly of claim 11, wherein individual ones of the plurality of magnets attached to a mounting plate are disc magnets.

16. The mounting assembly of claim 11, wherein individual ones of the plurality of magnets have a diameter of 10 mm and a height of 3 mm.

17. The mounting assembly of claim 11, wherein individual ones of the plurality of magnets have a pull force of at least 1 kg.

18. The mounting assembly of claim 11, wherein individual ones of the plurality of magnets have a pull force of at least 1.5 kg.

19. The mounting assembly of claim 11, wherein the plurality of magnets attached to a mounting plate have a collective pull force of at least 4 kg.

20. The mounting assembly of claim 11, wherein the plurality of magnets attached to a mounting plate have a collective pull force of at least 6 kg.

* * * * *